US012610430B2

(12) United States Patent
Lucas Cruz et al.

(10) Patent No.: US 12,610,430 B2
(45) Date of Patent: Apr. 21, 2026

(54) TEMPORARY EMERGENCY CALL-BACK ALLOWANCE OVER WIRELESS NETWORKS

(71) Applicant: T-Mobile USA, Inc., Bellevue, WA (US)

(72) Inventors: Jenniffer Lucas Cruz, Renton, WA (US); Oliver Rankine, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 402 days.

(21) Appl. No.: 18/193,606

(22) Filed: Mar. 30, 2023

(65) Prior Publication Data

US 2024/0334546 A1     Oct. 3, 2024

(51) Int. Cl.
H04W 76/30 (2018.01)
H04W 72/121 (2023.01)
H04W 76/50 (2018.01)

(52) U.S. Cl.
CPC ......... H04W 76/50 (2018.02); H04W 72/121 (2013.01)

(58) Field of Classification Search
CPC .... H04W 4/90; H04W 76/50; H04L 65/1096; H04L 65/1016; H04M 3/42195; H04M 11/04; H04M 2203/2005; H04M 2242/04
See application file for complete search history.

(56) References Cited

U.S. PATENT DOCUMENTS

| | | | | |
|---|---|---|---|---|
| 7,606,593 B1 * | 10/2009 | Vu | ........................ | H04W 76/36 |
| | | | | 455/518 |
| 8,244,204 B1 * | 8/2012 | Chen | ................. | H04M 3/42195 |
| | | | | 455/404.1 |
| 9,503,457 B2 * | 11/2016 | Huber | ................... | H04W 76/10 |
| 10,433,145 B2 * | 10/2019 | Mikan | .................... | H04W 4/90 |
| 10,499,247 B2 * | 12/2019 | Huber | ................. | H04L 43/0811 |

(Continued)

OTHER PUBLICATIONS

Samsung, "Blocked Numbers can get unblocked after Emergency Call," Retrieved on Feb. 2, 2023 from https://r2.community.samsung. com/t5/Others/Blocked-Numbers-can-get-unblocked-after-Emergency-Call/td-p/3239378, 7 pages.

(Continued)

*Primary Examiner* — Jung Liu
(74) *Attorney, Agent, or Firm* — Foley IP Law, PLLC

(57) ABSTRACT

Solutions for temporary emergency call-back allowance over wireless networks improve public safety. A user equipment (UE), associated with a suspended post-paid subscriber account, places an emergency call, such as e911 or e112, over a wireless network (e.g., cellular), and the network flags the subscriber account associated with the UE as permitted to receive incoming calls for some time period, such as 5 to 30 minutes. This permits the UE to receive calls from the public safety answering point (PSAP), in the event that the call is prematurely disconnected, or the PSAP has a need to call the UE back to obtain additional information. In some examples, the UE suspends call blocking, in order to preclude the possibility of inadvertently blocking an incoming call from the PSAP. In some examples, the network sends a call-back policy to the UE identifying the duration of suspending call blocking and/or receiving incoming calls.

20 Claims, 6 Drawing Sheets

(56)                References Cited

U.S. PATENT DOCUMENTS

| | | | |
|---|---|---|---|
| 2009/0265177 A1* | 10/2009 | Selby | G06Q 10/02 |
| | | | 705/1.1 |
| 2010/0041365 A1* | 2/2010 | Lott | H04W 60/00 |
| | | | 455/406 |
| 2010/0056099 A1 | 3/2010 | Kazmi | |
| 2010/0273445 A1 | 10/2010 | Dunn et al. | |
| 2011/0076996 A1* | 3/2011 | Burton | H04M 1/6075 |
| | | | 455/418 |
| 2019/0200205 A1* | 6/2019 | Mikan | H04W 4/90 |

OTHER PUBLICATIONS

"European Search Report Application No. 24166902.7", Mailed Date: Sep. 3, 2024, 7 Pages.

* cited by examiner

| UE    200 |
| --- |

| SIM        202 | EMERGENCY CALL MGR.  204 | BLOCKED LIST 212 |
| UE #  144 | TIMER  206 | BLOCK #   214 |
| | | UNKNOWN 216 |
| POLICY    136 | CALL BLOCK MGR.        208 | ACCEPT LIST    218 |
| CALLER ID # 210 | | ACCEPT #  220 |

| SUBSCRIBER DATABASE    300 |
| --- |
| ACCOUNT    302a |
| CUSTOMER ID 304 \| UE #  144 \| SUSPEND  306 \| TEMPORARY EM. CALL-BACK  308 |
| ACCOUNT    302b |
| ACCOUNT    302c |
| ACCOUNT    302d |

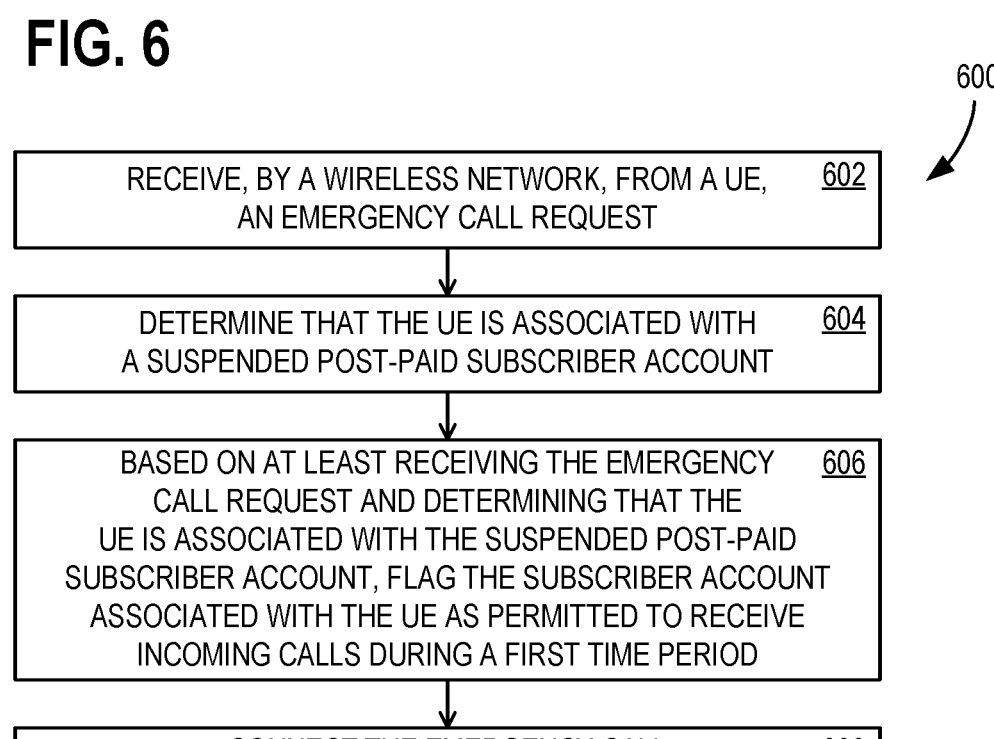

RECEIVE, BY A WIRELESS NETWORK, FROM A UE, 602
AN EMERGENCY CALL REQUEST

DETERMINE THAT THE UE IS ASSOCIATED WITH 604
A SUSPENDED POST-PAID SUBSCRIBER ACCOUNT

BASED ON AT LEAST RECEIVING THE EMERGENCY 606
CALL REQUEST AND DETERMINING THAT THE
UE IS ASSOCIATED WITH THE SUSPENDED POST-PAID
SUBSCRIBER ACCOUNT, FLAG THE SUBSCRIBER ACCOUNT
ASSOCIATED WITH THE UE AS PERMITTED TO RECEIVE
INCOMING CALLS DURING A FIRST TIME PERIOD

CONNECT THE EMERGENCY CALL 608

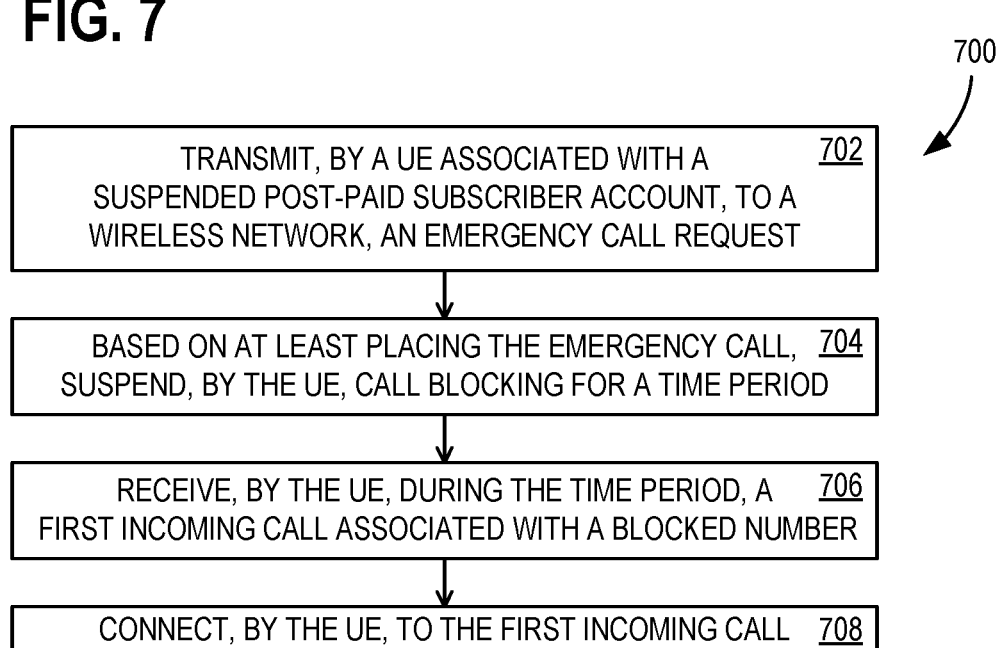

TRANSMIT, BY A UE ASSOCIATED WITH A 702
SUSPENDED POST-PAID SUBSCRIBER ACCOUNT, TO A
WIRELESS NETWORK, AN EMERGENCY CALL REQUEST

BASED ON AT LEAST PLACING THE EMERGENCY CALL, 704
SUSPEND, BY THE UE, CALL BLOCKING FOR A TIME PERIOD

RECEIVE, BY THE UE, DURING THE TIME PERIOD, A 706
FIRST INCOMING CALL ASSOCIATED WITH A BLOCKED NUMBER

CONNECT, BY THE UE, TO THE FIRST INCOMING CALL 708

TEMPORARY EMERGENCY CALL-BACK ALLOWANCE OVER WIRELESS NETWORKS

BACKGROUND

For reasons related to public safety, even when a user equipment (UE) has a subscriber identity module (SIM) that is linked to a post-paid subscriber account that is suspended for any reason (e.g., failure to pay or customer request for suspension), cellular networks nevertheless permit the UE to make emergency calls. Emergency calls placed by UEs over cellular networks, for example enhanced 911 (e911) calls in the United States (US) and enhanced 112 (e112) calls in the European Union (EU), are typically answered and handled by a public safety answering point (PSAP).

SUMMARY

The following summary is provided to illustrate examples disclosed herein but is not meant to limit all examples to any particular configuration or sequence of operations.

Disclosed solutions for temporary emergency call-back allowance over wireless networks include: receiving, by a wireless network, from a user equipment (UE), an emergency call request; determining that the UE is associated with a suspended post-paid subscriber account; based on at least receiving the emergency call request and determining that the UE is associated with the suspended post-paid subscriber account, flagging the subscriber account associated with the UE as permitted to receive incoming calls during a first time period; and connecting the emergency call.

Additional disclosed solutions include: transmitting, by a UE associated with a suspended post-paid subscriber account, to a wireless network, an emergency call request; based on at least placing the emergency call, suspending, by the UE, call blocking for a time period; receiving, by the UE, during the time period, a first incoming call associated with a blocked number; and connecting, by the UE, to the first incoming call.

BRIEF DESCRIPTION OF THE DRAWINGS

The disclosed examples are described below with reference to the accompanying drawing figures listed below, wherein:

FIGS. 6 and 7 illustrate additional flowcharts of exemplary operations associated with the architecture of FIG. 1.

Figure 1:
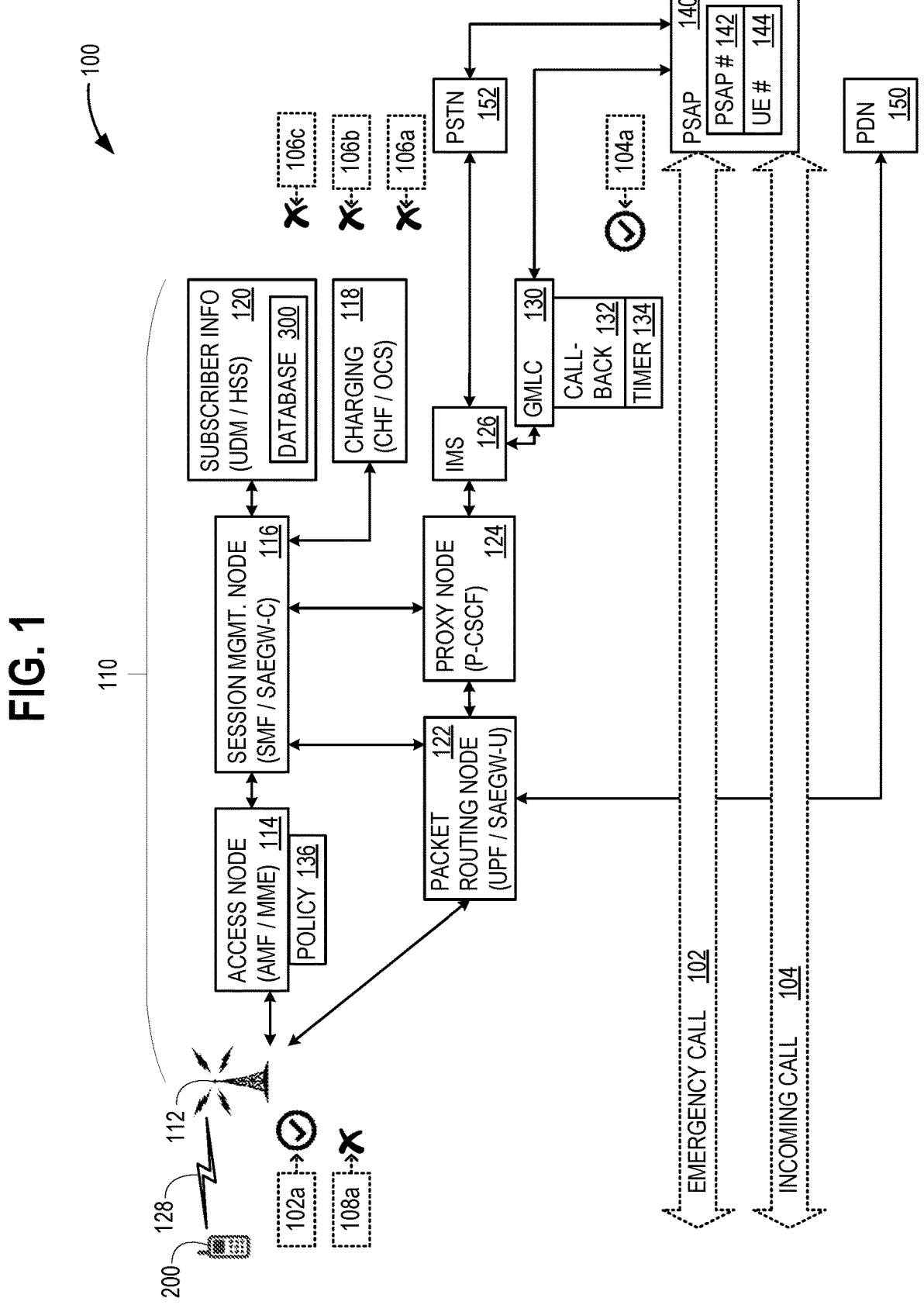
FIG. 1 illustrates an exemplary architecture that advantageously provides temporary emergency call-back allowance over a wireless network.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for temporary emergency call-back allowance over wireless networks improve public safety. A user equipment (UE), associated with a suspended post-paid subscriber account, places an emergency call, such as enhanced 911 (e911) or e112 calls, over a wireless network (e.g., cellular), and the network flags the subscriber account associated with the UE as permitted to receive incoming calls for some time period, such as 5 to 30 minutes. This permits the UE to receive calls from the public safety answering point (PSAP), in the event that the call is prematurely disconnected, or the PSAP has a need to call the UE back to obtain additional information. In some examples, the UE suspends call blocking, in order to preclude the possibility of inadvertently blocking an incoming call from the PSAP. In some examples, the network sends a call-back policy to the UE identifying the duration of suspending call blocking and/or receiving incoming calls.

If the emergency call is unexpectedly disconnected before the conversation is completed, or if the PSAP that handled the emergency call has any other need to call the UE back to obtain further information, the PSAP will be frustrated by the account suspension preventing the UE from receiving incoming phone calls. In some scenarios, this may create safety issues.

Aspects of the disclosure enhance public safety by permitting a PSAP to call the UE back, even when the UE would otherwise be blocked from cellular service, such as due to a customer having previously requested to suspend the account for the UE or a failure to pay on the account. This is accomplished, at least in part by, based on at least receiving the emergency call request and determining that the UE is associated with the suspended post-paid subscriber account, flagging the subscriber account associated with the UE as permitted to receive incoming calls during a first time period.

Aspects of the disclosure further enhance public safety by preventing the UE from inadvertently blocking an incoming call from a PSAP (e.g., when the UE is set to block all incoming calls, except those coming from a recognized permitted phone number). This is accomplished, at least in part by the UE suspending call blocking for a time period, based on at least placing the emergency call.

With reference now to the figures, FIG. 1 illustrates an architecture 100 that advantageously provides temporary emergency call-back allowance for a UE 200 during a time period 402 (shown in FIG. 4) after UE 200 makes an emergency call 102 over a wireless network 110. UE 200 reaches wireless network 110 via an air interface 128 with a radio access network (RAN) 112. Wireless network 110 also has an access node 114, a session management node 116, a charging node 118, a subscriber information node 120, a packet routing node 122, a proxy node 124, an internet protocol (IP) multimedia subsystem (IMS) 126, and a mobile location center 130.

In fifth generation (5G) cellular examples of wireless network 110, RAN 112 may comprise a gNode B (gNB), access node 114 may comprise an access mobility function (AMF), session management node 116 may comprise a session management function (SMF), charging node 118 may comprise a charging function (CHF), subscriber information node 120 may comprise a unified data manager function (UDM), and packet routing node 122 may comprise a user plane function (UPF).

In fourth generation (4G) cellular examples, RAN 112 may comprise an eNodeB (eNB), access node 114 may comprise a mobility management entity (MME), session management node 116 may comprise a system architecture evolution gateway (SAEGW) control plane (SAEGW-C), charging node 118 may comprise an online charging system (OCS), subscriber information node 120 may comprise a home subscriber service (HSS), and packet routing node 122 may comprise an SAEGW-user plane (SAEGW-U). An SAEGW is a combination of a serving gateway (SGW) and a packet data network gateway (PGW).

In some examples, proxy node 124 comprises a proxy call session control function (P-CSCF), and mobile location center 130 comprises gateway mobile location CENTER (GMLC). Wireless network 110 reaches a packet data network (PDN) 150 (e.g., the internet) via packet routing node 122, and reaches a public switched telephone network (PSTN) 152 via IMS 126.

Access node 114, session management node 116, charging node 118, and subscriber information node 120 carry signaling, such as for call setup, and are within a control plane of wireless network 110. Packet routing node 122 and proxy node 124 carry data packets, such as voice data packets, and are within a user plane of wireless network 110.

UEs may use pre-paid or post-paid accounts in order to use cellular networks, such as wireless network 110. A post-paid account is typically based on a contract in which the user is billed on a periodic basis (e.g., monthly) for service used the prior month. For example, if UE 200 places some toll calls (e.g., international calls), the user of UE 200 will receive a bill at some point in time after the call, showing charges due for the toll call, often in addition to a monthly (or other time period) service fee. If a user (account holder) does not pay the charges for cellular service, the operator of the cellular network may suspend the account, which prevents the UE associated with that account from making or receiving calls. Additionally, a user may request suspension of an account in order to avoid accruing service changes, for example if the user is not expected to be used for some extended period of time (e.g., no expected use for several months).

Emergency calls placed by UEs over cellular networks, for example enhanced 911 (e911) calls in the United States (US) and enhanced 112 (e112) calls in the European Union (EU), are typically answered and handled by a PSAP. IMS 126 typically connects wireless network 110 with PSAP 140 through IMS 126. Cellular networks typically operate in compliance with Third Generation Partnership Project (3GPP) technical standards (TSs), in addition to other TSs and governing laws and regulations.

Cellular networks in many countries are required to permit UEs associated with suspended post-paid subscriber accounts to make outgoing emergency calls, such as e911 and e112 calls. This is based on public policy valuing safety, and is an exception to the rights of cellular network operators to suspend post-paid subscriber accounts for non-payment.

In the examples described herein, UE 200 is associated with a suspended post-paid subscriber account (whether by customer request or non-payment), and so is typically unable to make outgoing calls or receive incoming calls. Wireless network 110 tracks UE 200 and its associated subscriber account in a subscriber database 300, which is shown in further detail in FIG. 3. The functionality described herein for subscriber database 300, though, may be located elsewhere within wireless network 110, including distributed among multiple nodes of wireless network 110.

However, in the examples described herein, UE 200 makes an outgoing emergency call 102. This occurs when the user dials 911 or 112 (or some other emergency number) on UE 200, and UE 200 transits an emergency call request 102*a* (for emergency call 102) to wireless network 110. Wireless network 110 honors this call request, because it is an emergency call. In some examples, emergency call request 102*a* does not involve UE transmitting dialed numbers to wireless network 110, but rather recognizing the dialed numbers and transmitting a uniform resource name (URN) to wireless network 110 (e.g., an SOS URN, such as "urn:service:sos"). Dialed numbers for landline numbers pass through wireless network 110 to PSTN 152, whereas the URN is routed to mobile location center 130.

When wireless network 110 permits emergency call 102 to go through, a call-back allowance logic 132 starts a network timer 134 and temporarily allows UE 200 to receive incoming calls until network timer 134 lapses. For example, PSAP 140, which received emergency call 102 from UE 200 may need to call UE 200 back after the termination of emergency call 102. This call-back from PSAP 140 to UE 200 is shown as an incoming call 104 (incoming to UE 200), and is initiated by an emergency call request 104*a*. In some examples, either or both of emergency call 102 and incoming call 104 may be a video call or a textual communication session.

Call-back allowance logic 132 and network timer 134 are illustrated as being within mobile location center 130, although they may instead be in another node of wireless network 110, such as within access node 114, session management node 116, charging node 118, or another node, or their functionality may be distributed among multiple nodes of wireless network 110. PSAP 140 receives the phone number for UE 200 as UE phone number 144, so that PSAP 140 knows the phone number to use to call UE 200 back. PSAP 140 may transmit its own phone number, PSAP phone number 142, in emergency call request 104*a*, which may then be available to UE 200 as a caller identification (caller ID) number before incoming call 104 is answered by UE 200.

In some examples, wireless network 110 transmits a call-back policy 136 to UE 200 that instructs UE 200 to suspend call blocking functionality and for how long. In the illustrated example, call-back policy 136 is stored in access node 114 for transmission to any UE that registers with RAN 112, although call-back policy 136 may be stored elsewhere in wireless network 110. In some examples, UE 200 has its own call-back policy 136, which may be superseded when the call-back policy 136 from wireless network 110 is received.

FIG. 1 also illustrates multiple unsuccessful requests for other calls, such as unsuccessful incoming call requests 106*a*-106*c* for other incoming calls (incoming to UE 200) and an unsuccessful outgoing call request 108*a* (for an outgoing call dialed by UE 200), which are blocked by wireless network. These unsuccessful requests 106*a*-108*a* are described in further detail in relation to FIG. 4.

Figures 2, 3:
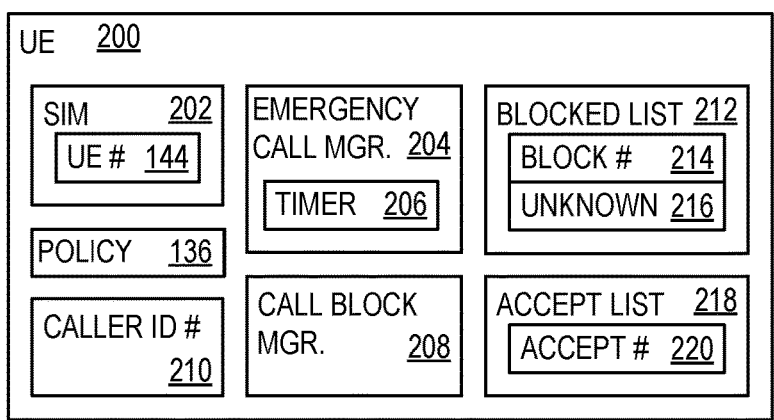
FIG. 2 illustrates further detail for the user equipment (UE) of the architecture of FIG. 1.
FIG. 3 illustrates further detail for the subscriber database of the architecture of FIG. 1.

FIG. 2 illustrates further detail for UE 200. UE 200 has a subscriber identity module (SIM) 202 (or a functional equivalent) that stores at least UE phone number 144. UE 200 also has a copy of call-back policy 136, either its own that was stored in UE 200 when UE 200 was provisioned, or downloaded from wireless network 110. UE 200 also has a caller ID number 210, which is PSAP phone number 142 when PSAP 140 calls UE 200, or the phone number of another caller.

UE 200 also has an emergency call manager 204 that controls the actions of UE 200 to suspend call blocking, which is controlled by a call blocking manager 208. UE 200 will suspend call blocking for the duration metered by a UE timer 206, which is specified in call-back policy 136, in some examples.

Call blocking manager 208 blocks selected incoming calls to UE 200, for example by refusing to ring UE 200 (e.g., play a ring tone), or even respond to wireless network 110 that the incoming call is refused. In some examples, when call blocking is not suspended, call blocking manager 208 compares caller ID number 210 with entries in a blocked number list 212 and/or an accepted number list 218.

Several possibilities exist. If caller ID number 210 matches blocked number 214 in blocked number list 212, the incoming call is blocked. If caller ID number 210 matches accepted number 220 in accepted number list 218, the incoming call is not blocked and UE 200 rings to alert the user of an incoming call. However, UE 200 may be set to block all numbers that are not within accepted number list 218, unrecognized numbers that are not within a contacts list within UE 200, or calls for which compete caller ID information is not provided. The cases of unrecognized numbers and no caller ID are shown as unknown number 216 within blocked number list 212. In these final few scenarios, UE 200 may inadvertently block calls incoming from PSAP 140 if PSAP 140 does not provide caller ID or if PSAP phone number 142 is unrecognized (not previously known) to UE 200. This is why UE 200 suspends call blocking.

In some examples, call blocking is suspended for all phone numbers. In some examples, call-back policy 136 includes a list of PSAP and other related phone numbers and UE 200 only suspends call blocking for phone numbers identified in call-back policy 136.

FIG. 3 illustrates further detail for subscriber database 300, as one of multiple possibilities for storing a flag that UE 200 is temporarily permitted to receive incoming calls, even with a suspended account. The scenario shown in FIG. 3 is for UE 200 within its home network. The subscriber account associated with UE 200 is subscriber account 302a, which is an abstraction that is represented by an entry in subscriber database 300. Other user accounts are also represented in subscriber database 300, such as a subscriber account 302b, a subscriber account 302c, and a subscriber account 302d.

Subscriber account 302a stores a customer ID 304, UE phone number 144, an account suspension flag 306, and a temporary emergency call-back permission flag 308. In these examples, account suspension flag 306 is set to true (indicating that subscriber account 302a is suspended): temporary emergency call-back permission flag 308 is false prior to emergency call 102, set to true upon UE 200 making emergency call 102, and then reset to false upon the expiration of the set temporary permission time (shown as time period 402 in FIG. 4). The entry for subscriber account 302a in subscriber database 300 permits identification that subscriber account 302a is a suspended post-paid subscriber account, and also contains additional information necessary for the operator of wireless network 110 to administer subscriber account 302a.

When UE 200 is roaming, and wireless network 110 is not the home network of UE 200, a temporary version of entry for subscriber account 302a is created and stored somewhere within wireless network 110, and may further indicate that UE 200 is visiting.

Figure 4:
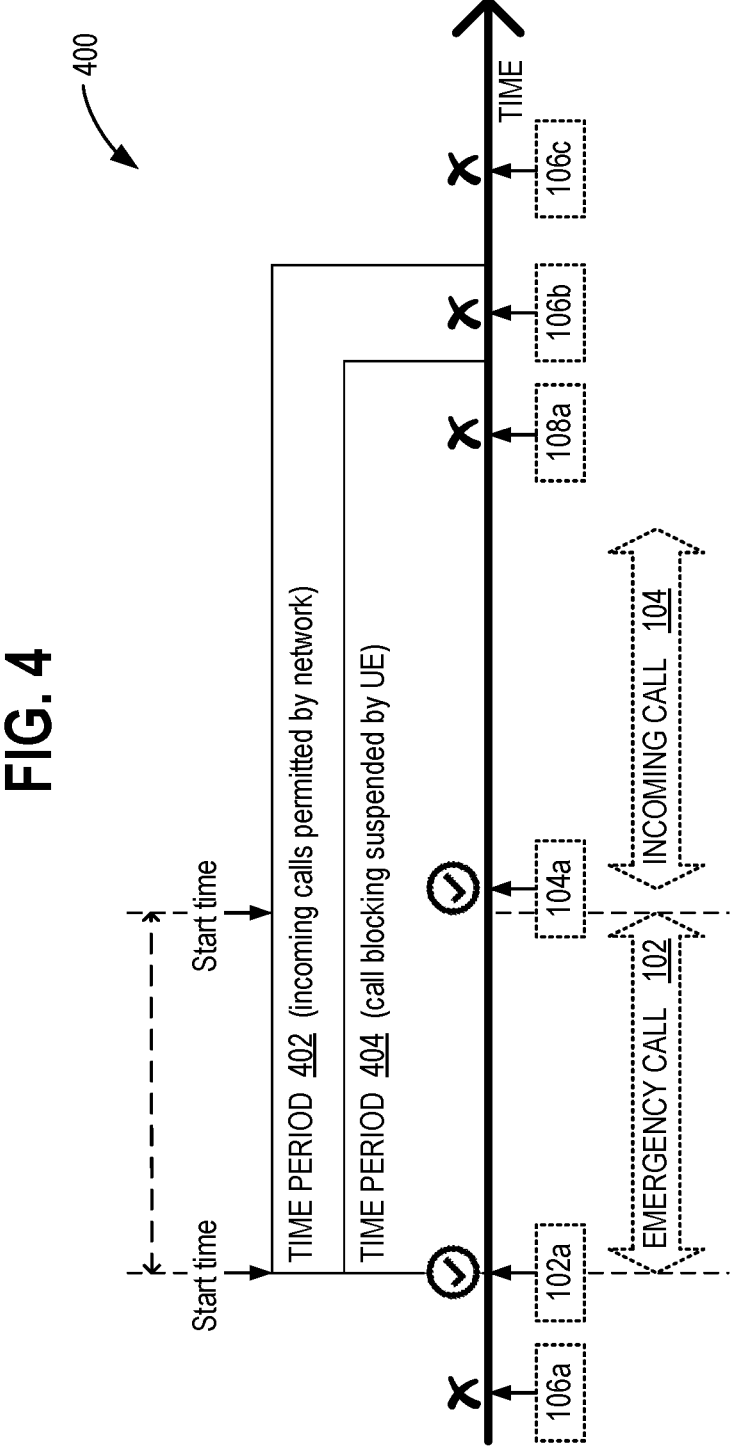
FIG. 4 illustrates a timeline of exemplary events associated with the architecture of FIG. 1.

FIG. 4 illustrates a timeline 400 of exemplary events associated with architecture 100. A first incoming call request 106a arrives prior to UE 200 making emergency call 102. Because subscriber account 302a is suspended, and temporary emergency call-back permission flag 308 is false prior to emergency call 102, wireless network 110 blocks the incoming call and does not signal (e.g., page) UE 200 to alert UE 200 to the incoming call attempt.

UE 200 attempts emergency call 102 by transmitting request 102a to wireless network 110. Request 102a is successful, emergency call 102 lasts for the time interval shown, and then terminates. Network timer 134 is started and temporary emergency call-back permission flag 308 is set to true for time period 402. Network timer 134 measures the time for time period 402, which may be anywhere from 5 to 30 minutes, or a different time duration. There are multiple options for starting time period 402, including when wireless network 110 receives request 102a, when emergency call 102 is connected (which should be fairly quickly after request 102a), upon termination of emergency call 102, or at some time during emergency call 102. Other options exist within the scope of this disclosure, and the examples provided herein are not intended to limit the disclosure in any way.

For example, if the time duration is set to 5 minutes, and network timer 134 is started upon request 102a, but emergency call 102 lasts for 6 minutes, network timer 134 will have expired by the end of emergency call 102, and PSAP 140 will not be able to call UE 200 back. However, if the time duration is set to a more generous 30 minutes, and network timer 134 is started upon termination of emergency call 102, incoming calls will still be blocked by wireless network 110. This has ramifications if PSAP 140 has alerted some emergency responders, and the other emergency responders attempt calling UE 200 during emergency call 102. Without the account suspension, UE 200 would see call waiting indications from the other emergency responders.

Thus, in some examples, subscriber account 302a is flagged to permit incoming calls (e.g., temporary emergency call-back permission flag 308 is set to true), but time period 402 does not begin expiring until emergency call 102 terminates. This permits the extent of the specified call-back period to be available, no matter how long emergency call 102 lasts.

Also, as shown a time period 404 is the duration for which call blocking is suspended by UE 200. In some scenarios, it is desirable for both time period 402 and time period 404 to coincide, such that they start and stop effectively simultaneously (i.e., within network latency tolerances). This is because there is no need for UE 200 to continue suspending call blocking after wireless network 110 has shut off service, and the example scenarios in which PSAP 140 cannot reach UE 200 due to call blocking by UE 200 (when otherwise the call would be permitted by wireless network 110) will occur.

However, for purposes of illustration, the undesirable scenario, in which UE 200 resumes call blocking while wireless network 110 still permits incoming calls, is shown and described below.

Returning to the timeline's order of occurrence, after the termination of emergency call 102, PSAP 140 (or a first responder) calls UE, which is shown as emergency call request 104a for incoming call 104. Emergency call request 104a is successful, incoming call 104 lasts for the time interval shown, and then terminates.

At some point during time period 402, UE 200 attempts an outgoing call with Outgoing call request 108a. Outgoing call request 108a is unsuccessful in this example, because wireless network 110 only permits incoming calls for UE 200. Some examples may permit both incoming and outgoing calls during time period 402, however.

As shown, time period 402 expires while time period 402 remains unexpired, and during this time period, a second incoming call request 106b is permitted by wireless network 110. Wireless network 110 pages UE 200 for the incoming call, but UE 200 blocks the incoming call. Due to this potential scenario, some examples may set both time period 402 and time period 404 to expire at the same time, such as after 5 to 30 minutes. A final incoming call request 106c is blocked by wireless network 110, because time period 402 is expired and temporary emergency call-back permission flag 308 is returned to false.

Figure 5:
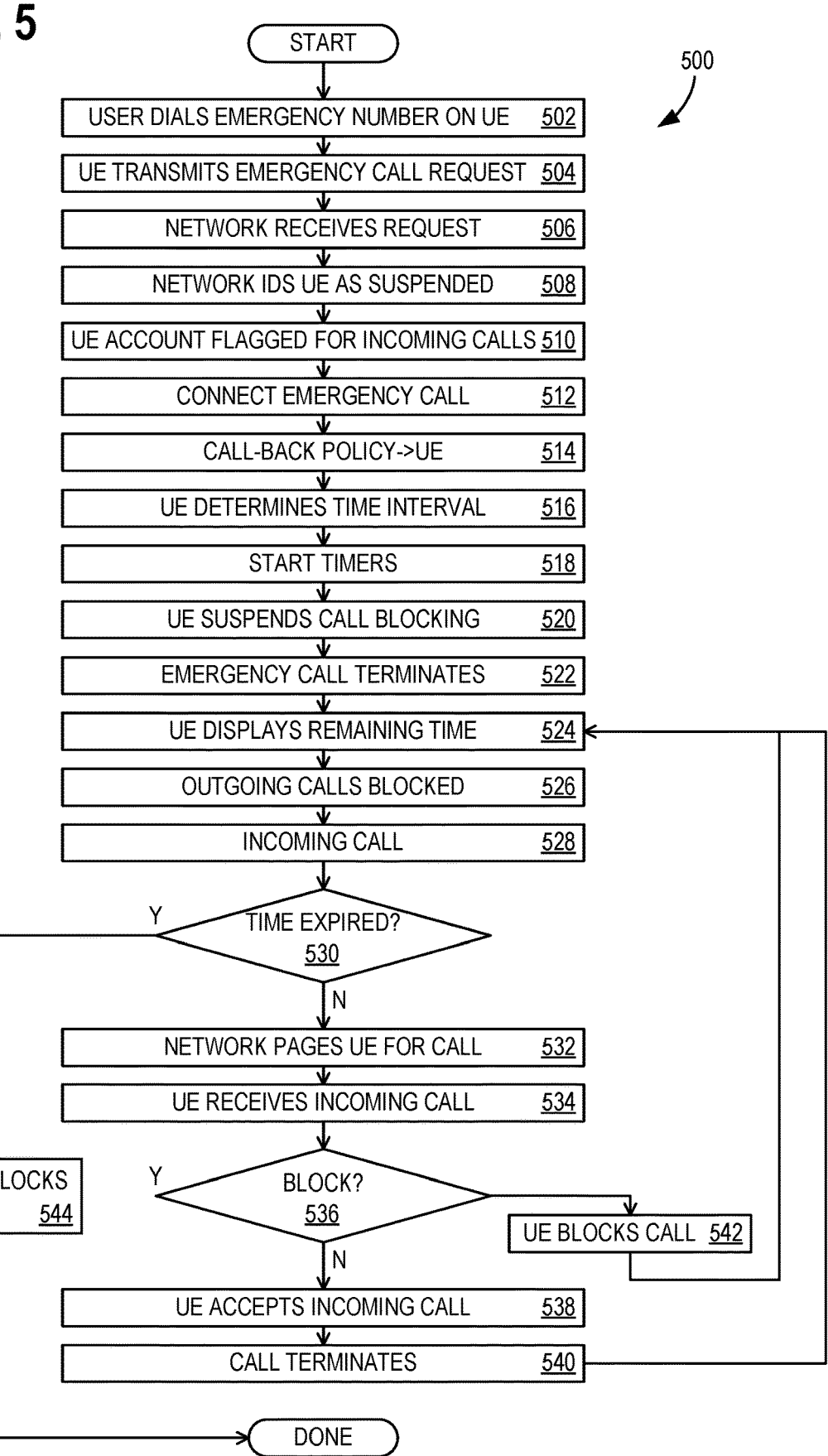
FIG. 5 illustrates a flowchart of exemplary operations associated with the architecture of FIG. 1.

FIG. 5 illustrates a flowchart 500 of exemplary operations associated with UE 200 placing emergency call 102. In some examples, at least a portion of flowchart 500 may be performed using one or more computing devices 800 of FIG. 8. Flowchart 500 commences with UE 200 attempting to place emergency call 102 in operation 502. In operation 504, UE 200 transmits request 102a for emergency call 102 to wireless network 110. In order to do this, UE 200 registers with at least RAN 112 and access node 114 of wireless network 110.

Wireless network 110 receives request 102a for emergency call 102 from UE 200 in operation 506 and determines that UE 200 is associated with a suspended post-paid subscriber account (e.g., subscriber account 302a) in operation 508. In operation 510, wireless network 110 flags the subscriber account associated with UE 200 as permitted to receive incoming calls during time period 402, based on at least receiving request 102a for emergency call 102 and determining that UE 200 is associated with a suspended post-paid subscriber account. That is, during time period 402, wireless network 110 permits paging of UE 200 for incoming calls, even with a suspended subscriber account. In some examples, the subscriber account associated with UE 200 is flagged as permitted to receive incoming calls only from PSAP 140 or a set of PSAPs in the area, or a list of emergency responder of first responder phone numbers. These may be identified within call-back policy 136.

Emergency call 102 is connected between UE 200 and PSAP 140 in operation 512, and wireless network 110 transmits call-back policy 136 for handling incoming calls to UE 200 in operation 514. UE 200 receives call-back policy 136 from wireless network 110 in operation 514 and determines the duration of time period 404, based on at least call-back policy 136, in operation 516. In operation 518, wireless network 110 starts network timer 134 to track time period 402 and UE 200 starts UE timer 206 to track time period 404. Time periods 402 and 404 may be from 5 minutes to 30 minutes in duration from the start or termination of emergency call 102.

UE 200 suspends call blocking for time period 404 in operation 520, and emergency call 102 terminates as operation 522. In operation 524 (in some examples), UE 200 displays time remaining in time period 402 and/or time period 404. This alerts the user of UE 200 that calls still may be received within the displayed time. In some examples, wireless network 110 blocks the outgoing non-emergency call by UE 200 during time period 402, in operation 526.

In operation 528, wireless network 110 receives emergency call request 104a for incoming call 104 during time period 402. Wireless network 110 determines whether time period 402 has expired (i.e., whether network timer 134 has lapsed) in decision operation 530. If not, wireless network 110 pages UE 200 for incoming call 104 in operation 532, and wireless network 110 connects incoming call 104 in operation 534. In this scenario, UE 200 receives incoming call 104 during time period 402 and time period 404.

In decision operation 536, UE 200 determines whether to block incoming call 104. However, time period 404 is still active, and has not expired. So UE 200 rings and does not block incoming call 104, even if incoming call 104 is associated with a blocked number (e.g., an unrecognized number or unknown number due to no caller ID). When the user answers, UE 200 connects to incoming call 104 in operation 538. Incoming call 104 terminates in operation 540.

Flowchart 500 then returns to operation 524. For purposes of illustration only, the next scenario shown for operations 524-542 is that time period 404 expires while time period 402 is still active. During the second pass through operation 528, wireless network 110 receives incoming call request 106b for another incoming call for UE 200. Wireless network 110 pages UE 200 for the incoming call in operation 532, but this time, UE 200 decides to block the incoming call in this second pass through decision operation 536. So, UE 200 blocks this new incoming call in operation 542, refuses connection, and does not ring to alert the user to the fourth incoming call:

Flowchart 500 then returns to operation 524 again. In this third pass through operation 524 time period 402 is expired, so UE 200 displays this status. Wireless network 110 receives incoming call request 106c for yet another incoming call for UE 200 in the third pass through operation 528. However, this time wireless network 110 determines that time period 402 is expired in decision operation 530. Flowchart 500 then moves to operation 544 in which wireless network 110 blocks the new incoming call.

FIG. 6 illustrates a flowchart 600 of exemplary operations associated with examples of architecture 100. In some examples, at least a portion of flowchart 600 may be performed using one or more computing devices 800 of FIG. 8. Flowchart 600 commences with operation 602, which includes receiving, by a wireless network, from a UE, an emergency call request.

Operation 604 includes determining that the UE is associated with a suspended post-paid subscriber account. Operation 606 includes, based on at least receiving the emergency call request and determining that the UE is associated with the suspended post-paid subscriber account, flagging the subscriber account associated with the UE as permitted to receive incoming calls during a first time period. Operation 608 includes connecting the emergency call.

FIG. 7 illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes transmitting, by a UE associated with a suspended post-paid subscriber account, to a wireless network, an emergency call request.

Operation 704 includes, based on at least placing the emergency call, suspending, by the UE, call blocking for a time period. Operation 706 includes receiving, by the UE, during the time period, a first incoming call associated with a blocked number. Operation 708 includes connecting, by the UE, to the first incoming call.

Figure 8:
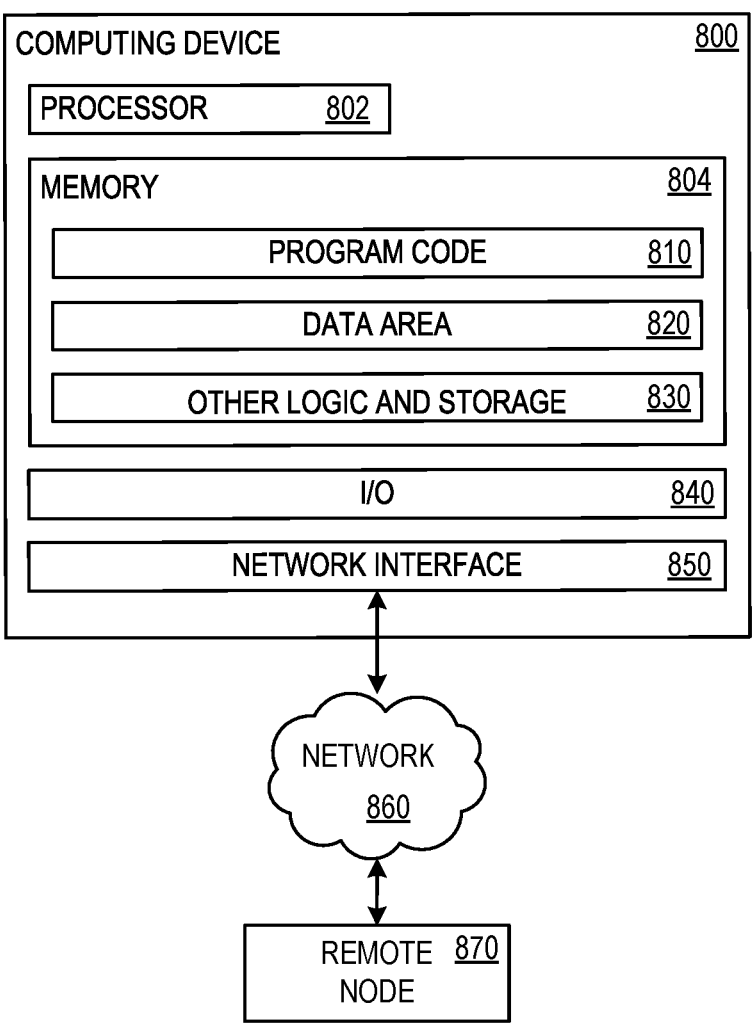
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory

804 that holds program code 810, data area 820, and other logic and storage 830. Memory 804 is any device allowing information, such as computer executable instructions and/ or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800. For example, a remote node 870 may represent another of the above-noted nodes within architecture 100.

ADDITIONAL EXAMPLES

An example method comprises: receiving, by a wireless network, from a UE, an emergency call request; determining that the UE is associated with a suspended post-paid subscriber account; based on at least receiving the emergency call request and determining that the UE is associated with the suspended post-paid subscriber account, flagging the subscriber account associated with the UE as permitted to receive incoming calls during a first time period; and connecting the emergency call.

An example system comprises: a processor; and a computer-readable medium storing instructions that are operative upon execution by the processor to: receive, by a wireless network, from a UE, an emergency call request; determine that the UE is associated with a suspended post-paid subscriber account; based on at least receiving the emergency call request and determining that the UE is associated with the suspended post-paid subscriber account, flag the subscriber account associated with the UE as permitted to receive incoming calls during a first time period; and connect the emergency call.

One or more example computer storage devices has computer-executable instructions stored thereon, which, upon execution by a computer, cause the computer to perform operations comprising: receiving, by a wireless network, from a UE, an emergency call request; determining that the UE is associated with a suspended post-paid subscriber account; based on at least receiving the emergency call request and determining that the UE is associated with the suspended post-paid subscriber account, flagging the subscriber account associated with the UE as permitted to receive incoming calls during a first time period; and connecting the emergency call.

Another example method comprises: transmitting, by a UE associated with a suspended post-paid subscriber account, to a wireless network, an emergency call request; based on at least placing the emergency call, suspending, by the UE, call blocking for a time period: receiving, by the UE, during the time period, a first incoming call associated with a blocked number; and connecting, by the UE, to the first incoming call.

Another example system comprises: a processor; and a computer-readable medium storing instructions that are operative upon execution by the processor to: transmit, by a UE associated with a suspended post-paid subscriber account, to a wireless network, an emergency call request; based on at least placing the emergency call, suspend, by the UE, call blocking for a time period; receive, by the UE, during the time period, a first incoming call associated with a blocked number; and connect, by the UE, to the first incoming call.

One or more additional example computer storage devices has computer-executable instructions stored thereon, which, upon execution by a computer, cause the computer to perform operations comprising: transmitting, by a UE associated with a suspended post-paid subscriber account, to a wireless network, an emergency call request; based on at least placing the emergency call, suspending, by the UE, call blocking for a time period; receiving, by the UE, during the time period, a first incoming call associated with a blocked number; and connecting, by the UE, to the first incoming call.

Alternatively, or in addition to the other examples described herein, examples include any combination of the following:

receiving, by the wireless network, during the first time period, a first incoming call request for the UE;
  connecting the first incoming call;
  receiving, by the wireless network, after expiration of the first time period, a second incoming call request for the UE;
  blocking the second incoming call;
  blocking, by the wireless network, during the first time period, outgoing non-emergency calls by the UE;
  transmitting, to the UE, a call-back policy for handling incoming calls after placing the emergency call;
  based on at least placing the emergency call, suspending, by the UE, call blocking for a second time period;
  a node of the wireless network that flags the subscriber account associated with the UE as permitted to receive incoming calls comprises a node selected from the group consisting of: a mobility node, a session management node, a charging node, and a mobile location center;
  the first time period is from 5 minutes to 30 minutes in duration;
  the wireless network comprises a cellular network;
  transmitting, by the wireless network, to the UE, the call-back policy for handling incoming calls after placing the emergency call;
  receiving, by the UE, from the wireless network, a call-back policy for handling incoming calls after placing the emergency call;
  the UE determines a duration of the time period based on at least the call-back policy;
  transmitting, by a UE associated with a suspended post-paid subscriber account, to a wireless network, an emergency call request;
  the emergency call request comprises a URN;
  the URN comprises an SOS URN;
  the URN comprises urn:service:sos;
  the emergency call comprises an e911 call or an e112 call;
  the emergency call is connected between the UE and a PSAP;
  determining whether the UE is associated with a suspended post-paid subscriber account;
  starting a timer in the wireless network;
  the first time period starts upon receiving the emergency call request;

the first time period starts upon connecting the emergency call;

the first time period starts upon a termination of the emergency call;

the first time period starts during the emergency call;

the call-back policy specifies the time period;

the subscriber account associated with the UE is flagged as permitted to receive incoming calls from the PSAP;

the second time period is at least as long as the first time period;

receiving, by the UE, during the second time period, a third incoming call associated with a blocked number;

the UE blocks all numbers not on a predetermined acceptance list;

connecting, by the UE, to the third incoming call;

receiving, by the UE, after expiration of the second time period, a fourth incoming call associated with a blocked number;

refusing connection, by the UE, to the fourth incoming call;

the mobility node comprises an AMF or an MME;

the session management node comprises an SMF or an SAEGW-C;

the charging node comprises a CHF or an OCS;

the mobile location center comprises a GMLC)

the second time period is from 5 minutes to 30 minutes in duration; and the UE displays time remaining in the first or second time period.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

receiving, by a wireless network, from a user equipment (UE), an emergency call;

determining that the UE is associated with a suspended post-paid subscriber account, wherein the suspended post-paid subscriber account has been suspended by an operator of the wireless network due to non-payment;

based on at least receiving the emergency call and determining that the UE is associated with the suspended post-paid subscriber account, flagging the suspended post-paid subscriber account associated with the UE as permitted to receive incoming calls during a first time period; and connecting the emergency call.

2. The method of claim 1, further comprising:

receiving, by the wireless network, during the first time period, a first incoming call request for the UE;

connecting the first incoming call request;

receiving, by the wireless network, after expiration of the first time period, a second incoming call request for the UE; and blocking the second incoming call request.

3. The method of claim 1, further comprising:

blocking, by the wireless network, during the first time period, outgoing non-emergency calls by the UE.

4. The method of claim 1, further comprising:

transmitting, to the UE, a call-back policy for handling the incoming calls after placing the emergency call.

5. The method of claim 1, further comprising:

based on at least placing the emergency call, suspending, by the UE, call blocking for a second time period.

6. The method of claim 1, wherein a node of the wireless network that flags the suspended post-paid subscriber account associated with the UE as permitted to receive incoming calls comprises a node selected from the group consisting of:

a mobility node, a session management node, a charging node, and a mobile location center.

7. The method of claim 1, wherein the first time period is from 5 minutes to 30 minutes in duration.

8. A system comprising:

a processor; and a non-transitory computer-readable medium storing instructions that are operative upon execution by the processor to:

receive, by a wireless network, from a user equipment (UE), an emergency call;

determine that the UE is associated with a suspended post-paid subscriber account, wherein the suspended post-paid subscriber account has been suspended by an operator of the wireless network due to non-payment;

based on at least receiving the emergency call and determining that the UE is associated with the suspended post-paid subscriber account, flag the suspended post-paid subscriber account associated with the UE as permitted to receive incoming calls during a first time period; and connect the emergency call.

9. The system of claim 8, wherein the instructions are further operative to:

receive, by the wireless network, during the first time period, a first incoming call request for the UE;

connect the first incoming call request;

receive, by the wireless network, after expiration of the first time period, a second incoming call request for the UE; and block the second incoming call request.

10. The system of claim 8, wherein the instructions are further operative to:

block, by the wireless network, during the first time period, outgoing non-emergency calls by the UE.

11. The system of claim 8, wherein the instructions are further operative to:

transmit, to the UE, a call-back policy for handling the incoming calls after placing the emergency call.

12. The system of claim 8, wherein the instructions are further operative to:

based on at least placing the emergency call, suspend, by the UE, call blocking for a second time period.

13. The system of claim 8, wherein a node of the wireless network that flags the suspended post-paid subscriber account associated with the UE as permitted to receive the incoming calls comprises a node selected from the group consisting of:

a mobility node, a session management node, a charging node, and a mobile location center.

14. The system of claim 8, wherein the first time period is from 5 minutes to 30 minutes in duration.

15. One or more non-transitory computer storage devices having computer-executable instructions stored thereon, which, upon execution by a computer, cause the computer to perform operations comprising:

receiving, by a wireless network, from a user equipment (UE), an emergency call;

determining that the UE is associated with a suspended post-paid subscriber account, wherein the suspended post-paid subscriber account has been suspended by an operator of the wireless network due to non-payment;

based on at least receiving the emergency call and determining that the UE is associated with the suspended post-paid subscriber account, flagging the suspended post-paid subscriber account associated with the UE as permitted to receive incoming calls during a first time period; and connecting the emergency call.

16. The one or more non-transitory computer storage devices of claim 15, wherein the operations further comprise:

receiving, by the wireless network, during the first time period, a first incoming call request for the UE;

connecting the first incoming call request;

receiving, by the wireless network, after expiration of the first time period, a second incoming call request for the UE; and blocking the second incoming call request.

17. The one or more non-transitory computer storage devices of claim 15, wherein the operations further comprise:

blocking, by the wireless network, during the first time period, outgoing non-emergency calls by the UE.

18. The one or more non-transitory computer storage devices of claim 15, wherein the operations further comprise:

transmitting, to the UE, a call-back policy for handling the incoming calls after placing the emergency call.

19. The one or more non-transitory computer storage devices of claim 15, wherein the operations further comprise:

based on at least placing the emergency call, suspending, by the UE, call blocking for a second time period.

20. The one or more non-transitory computer storage devices of claim 15, wherein a node of the wireless network that flags the suspended post-paid subscriber account associated with the UE as permitted to receive incoming calls comprises a node selected from the group consisting of:

a mobility node, a session management node, a charging node, and a mobile location center.

* * * * *